(12) United States Patent
Morizaki et al.

(10) Patent No.: US 9,104,167 B2
(45) Date of Patent: Aug. 11, 2015

(54) PROTECTION DEVICE, IMAGE FORMING APPARATUS AND METHOD, AND NON-TRANSITORY COMPUTER READABLE MEDIUM

(71) Applicant: FUJI XEROX CO., LTD., Minato-ku, Tokyo (JP)

(72) Inventors: Sou Morizaki, Saitama (JP); Naohisa Fujita, Kanagawa (JP); Atsushi Hiroi, Kanagawa (JP); Katsuya Saito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 82 days.

(21) Appl. No.: 13/918,198

(22) Filed: Jun. 14, 2013

(65) Prior Publication Data

US 2014/0133874 A1 May 15, 2014

(30) Foreign Application Priority Data

Nov. 9, 2012 (JP) .................................. 2012-247615

(51) Int. Cl.
*G03G 15/00* (2006.01)
*H02H 9/04* (2006.01)

(52) U.S. Cl.
CPC . *G03G 15/80* (2013.01); *H02H 9/04* (2013.01)

(58) Field of Classification Search
USPC ............................................ 361/93.9; 399/37
See application file for complete search history.

(56) References Cited

U.S. PATENT DOCUMENTS

2011/0007442 A1* 1/2011 Fukuhara et al. ................ 361/88

FOREIGN PATENT DOCUMENTS

JP          5-168231 A       7/1993
JP          2007-298906 A   11/2007

* cited by examiner

*Primary Examiner* — Hoang Ngo
(74) *Attorney, Agent, or Firm* — Sughrue Mion, PLLC

(57) ABSTRACT

A protection device includes a pair of electrodes and an output unit. In the pair of electrodes, one electrode, connected to a connection line that connects a load and a power supply that supplies voltage to the load, performs discharge toward the other electrode in response to application, to one electrode, of an abnormal voltage greater than or equal to a pre-set voltage exceeding a steady-state voltage output by the power supply in a steady state. The output unit detects discharge current that flows in the other electrode and outputs the detected discharge current as a control signal.

10 Claims, 9 Drawing Sheets

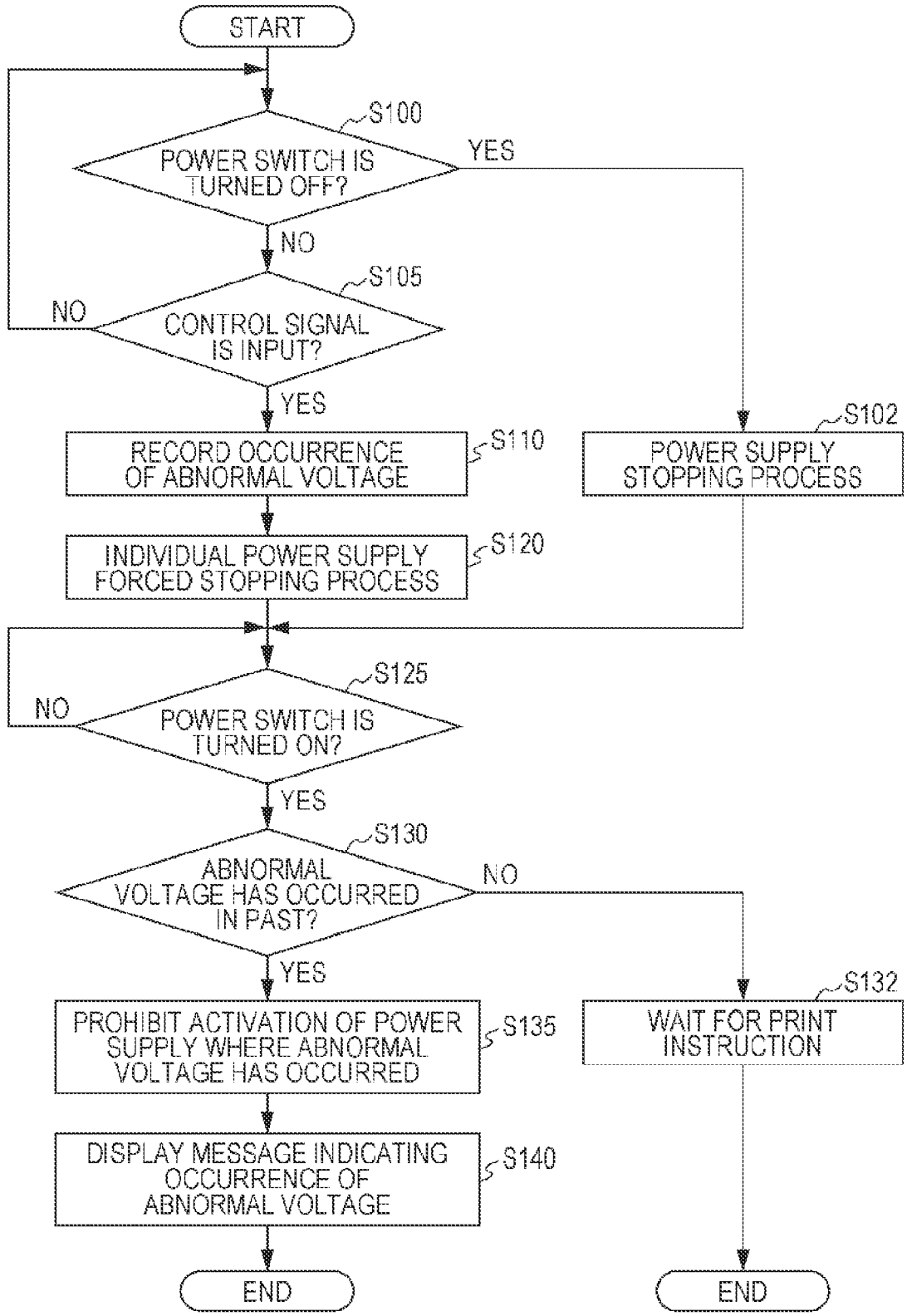

PROTECTION DEVICE, IMAGE FORMING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-247615 filed Nov. 9, 2012.

BACKGROUND

Technical Field

The present invention relates to a protection device, an image forming apparatus and method, and a non-transitory computer readable medium.

SUMMARY

According to an aspect of the invention, there is provided a protection device including a pair of electrodes and an output unit. In the pair of electrodes, one electrode, connected to a connection line that connects a load and a power supply that supplies voltage to the load, performs discharge toward the other electrode in response to application, to one electrode, of an abnormal voltage greater than or equal to a pre-set voltage exceeding a steady-state voltage output by the power supply in a steady state. The output unit detects discharge current that flows in the other electrode and outputs the detected discharge current as a control signal.

BRIEF DESCRIPTION OF THE DRAWINGS

Exemplary embodiments of the present invention will be described in detail based on the following figures, wherein:

FIG. 9 is a flowchart of a process executed by the computer of the image forming apparatus according to a second exemplary embodiment.

DETAILED DESCRIPTION

Figure 1:
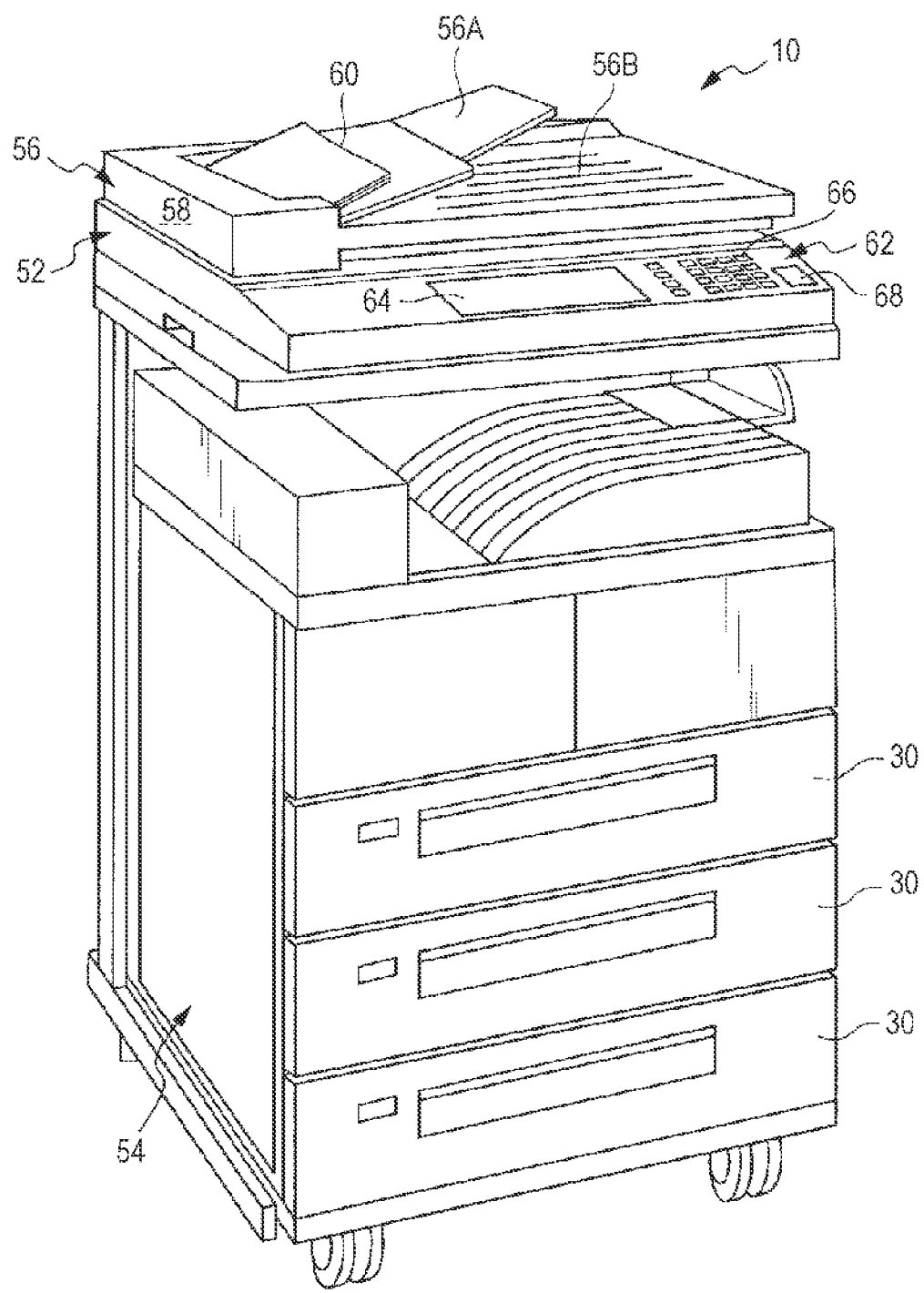
FIG. 1 is a perspective view of a major portion of an image forming apparatus according to exemplary embodiments.

Hereinafter, exemplary embodiments of the invention will be described in detail with reference to the drawings. Elements and steps that perform activities with the same operations and functions are given the same reference numerals throughout the drawings, and overlapping descriptions may be appropriately omitted.

First Exemplary Embodiment

FIG. 1 illustrates the configuration of an image forming apparatus 10 according to a first exemplary embodiment. The image forming apparatus 10 receives various types of data via a communication line (not illustrated) and has a print function that performs an image forming process based on the received data and a copy function that copies an image recorded on a subject copy to a recording sheet.

An image reading unit 52 is provided in an upper portion of the image forming apparatus 10. An image forming unit 54 is arranged below the image reading unit 52. The image reading unit 52 includes a subject copy carrying unit 58 in a subject copy covering part 56. The subject copy carrying unit 58 sequentially pulls subject copies 60 placed on a subject copy feeding part 56A provided at the subject copy covering part 56, and carries the subject copies 60 onto a platen glass (not illustrated). The image reading unit 52 reads image information recorded on the subject copies 60 carried onto the platen glass. Also, the subject copy carrying unit 58 ejects the subject copies 60, whose image has been read, onto a subject copy ejection part 56B provided at the subject copy covering part 56.

The image reading unit 52 includes a display operation unit 62 that accepts various instructions input by operations performed by a user, and displays various types of information of the image forming apparatus 10. The display operation unit 62 includes a touch panel type display 64 that displays various types of information and display buttons that realize acceptance of instructions input by user operations by using a software program, hardware keys 66 such as a numeric keypad and a start button, and a main power switch 68. With the use of the display buttons of the display 64 and the hardware keys 66, the display operation unit 62 is used to set the number of copies and/or a scaling factor when the copy function is used.

The image forming unit 54 forms an image on a recording medium accommodated in a sheet container 30 by using, for example, the so-called electrophotographic system.

Figure 2:
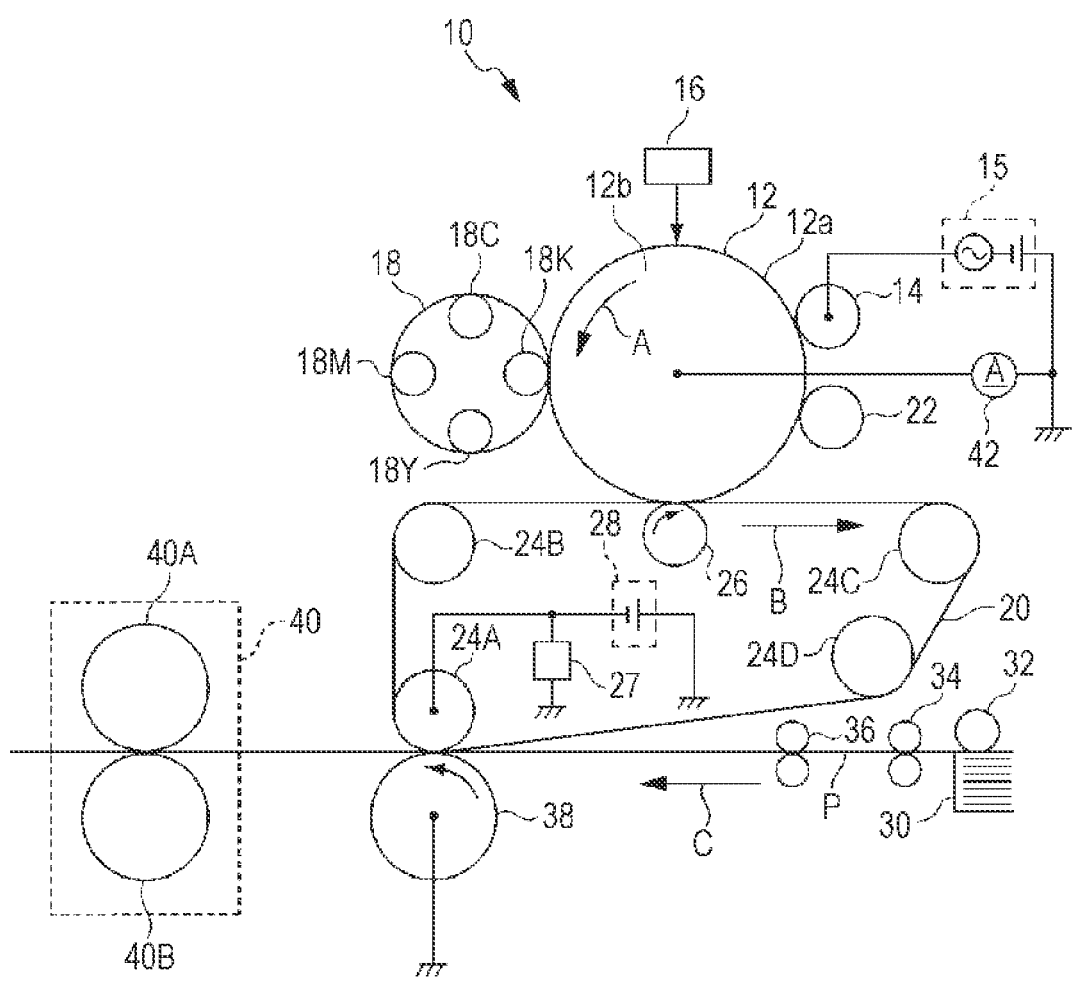
FIG. 2 is a schematic side view illustrating the configuration of a major portion of the image forming apparatus according to the exemplary embodiments.

FIG. 2 is a schematic side view illustrating the configuration of a major portion of the image forming unit 54 of the image forming apparatus 10 according to the first exemplary embodiment.

As depicted in FIG. 2, the image forming apparatus 10 includes a photoconductor drum 12 rotated by a motor (not illustrated) in a direction indicated by arc-shaped arrow A, which is a sub-scanning direction, at a predetermined rotation speed. The photoconductor drum 12 includes a photoconductor film 12a that is provided on a periphery face and that includes a charge transport layer and a charge generation layer, and a base member 12b that supports the photoconductor film 12a and that is formed of aluminum or the like.

A charging roller 14 that charges the periphery face of the photoconductor drum 12 is provided on and in contact with the periphery face of the photoconductor drum 12. Although the charging roller 14, which is a contact-type charger, is applied in the image forming apparatus 10 according to the first exemplary embodiment, a non-contact-type charger such as a scorotron charger or a corotron charger may be used.

The charging roller 14 is a conductive roller and is configured to be freely rotatable in accordance with the rotation of the photoconductor drum 12.

Also, voltage generated by superimposing alternating current (AC) voltage and direct current (DC) voltage (hereinafter may also be referred to as "superimposed voltage") is applied to the charging roller 14 from a charging power supply 15. Accordingly, the charging roller 14 generates discharge at a gap between the charging roller 14 and the photoconductor drum 12 and uniformly charges the periphery face of the photoconductor drum 12 at a predetermined potential. A DC detector 42 is provided in the image forming apparatus 10. The DC detector 42 detects the value of a DC component caused by the charging roller 14 to flow into the photoconductor drum 12. Since the superimposed voltage applied to the charging roller 14 is negative in the first exemplary embodiment, the charging roller 14 charges the periphery face of the photoconductor drum 12 at a negative potential.

A laser beam scanner 16 is arranged downstream from the charging roller 14, in the direction indicated by arc-shaped arrow A of the photoconductor drum 12. The laser beam scanner 16 modulates a laser beam emitted from a light source, in accordance with an image to be formed, deflects the light beam in a main scanning direction, and performs scanning in parallel with the axis of the photoconductor drum 12, on the periphery face of the photoconductor drum 12. Accordingly, an electrostatic latent image is formed on the periphery face of the photoconductor drum 12.

A developing device 18 is arranged downstream from the laser beam scanner 16, in the direction indicated by arc-shaped arrow A of the photoconductor drum 12. The developing device 18 includes a roller-shaped container arranged to be rotatable. Four containing parts corresponding to yellow (Y), magenta (M), cyan (C), and black (K) are formed in this container, and developing units 18Y, 18M, 18C, and 18K are provided in the four containing parts.

The developing units 18Y, 18M, 18C, and 18K each include a developing roller (not illustrated), and the developing units 18Y, 18M, 18C, and 18K retain Y, M, C, and K color toners, respectively. A static eliminator/cleaner 22 is provided on the opposite side of the developing device 18 across the photoconductor drum 12. The static eliminator/cleaner 22 has the function of removing electricity on the periphery face of the photoconductor drum 12 and the function of removing unnecessary toners left on the periphery face of the photoconductor drum 12.

The image forming apparatus 10 according to the first exemplary embodiment forms a color image while the photoconductor drum 12 rotates four times. That is, during four rotations of the photoconductor drum 12, the charging roller 14 continues charging the periphery face of the photoconductor drum 12, and the static eliminator/cleaner 22 continues removing electricity on the periphery face of the photoconductor drum 12.

The laser beam scanner 16 repeats scanning on the periphery face of the photoconductor drum 12 using a laser beam modulated in accordance with any of pieces of image information of Y, M, C, and K indicating a color image to be formed, while switching image information to be used to modulate a laser beam every time the photoconductor drum 12 rotates once.

Also, while any of the developing units 18Y, 18M, 18C, and 18K faces the periphery face of the photoconductor drum 12, the developing device 18 causes that developing unit 18 to operate, develops an electrostatic latent image formed on the periphery face of the photoconductor drum 12 to a particular color, and forms a toner image of the particular color on the periphery face of the photoconductor drum 12. Every time the photoconductor drum 12 rotates once, the developing device 18 repeats this series of operations while rotating the container in order to switch the developing part used to develop an electrostatic image.

Accordingly, every time the photoconductor drum 12 rotates once, toner images of Y, M, C, and K are sequentially formed on the periphery face of the photoconductor drum 12 so as to overlap one another. At the time the photoconductor drum 12 rotates four times, a color toner image is formed on the periphery face of the photoconductor drum 12.

An endless intermediate transfer belt 20 is arranged downstream of the photoconductor drum 12. The intermediate transfer belt 20 is wound on rollers 24A to 24D. The intermediate transfer belt 20 is arranged so that its periphery face contacts the periphery face of the photoconductor drum 12. The rollers 24A to 24D rotate in response to transmission of the driving force of a motor (not illustrated), thereby rotating the intermediate transfer belt 20 in a direction indicated by arrow B.

A first transfer roller 26 is arranged on the opposite side of the photoconductor drum 12 across the intermediate transfer belt 20. The first transfer roller 26 presses the intermediate transfer belt 20 against the periphery face of the photoconductor drum 12. The image forming apparatus 10 includes a first transfer power supply (not illustrated) for supplying power to the first transfer roller 26 in order to transfer a toner image on the photoconductor drum 12 to the first transfer roller 26.

Therefore, the first transfer power supply (not illustrated) supplies power to the first transfer roller 26, and the first transfer roller 26 presses the intermediate transfer belt 20 against the periphery face of the photoconductor drum 12, thereby transferring a toner image formed on the periphery face of the photoconductor drum 12 to an image forming face of the intermediate transfer belt 20. When a toner image formed on the periphery face of the photoconductor drum 12 is transferred to the intermediate transfer belt 20, the static eliminator/cleaner 22 cleans a region of the periphery face of the photoconductor drum 12 which has retained the transferred toner image.

The sheet container 30 is arranged downstream from the intermediate transfer belt 20. The sheet container 30 contains a pile of many recording sheets P serving as recording media. An extracting roller 32 is arranged above left of the sheet container 30. Pairs of rollers 34 and 36 are sequentially arranged downstream in a direction in which the recording sheets P are extracted by the extracting roller 32. In response to rotation of the extracting roller 32, the top recording sheet P of the pile is extracted from the sheet container 30 and is carried by the pairs of rollers 34 and 36.

The recording sheet P carried by the pairs of rollers 34 and 36 is fed in between the intermediate transfer belt 20 and a second transfer roller 38.

A second transfer power supply 28 applies voltage to the roller 24A, and the second transfer roller 38 and the roller 24A press the intermediate transfer belt 20 against the recording sheet P, thereby transferring the toner image formed on the image forming face of the intermediate transfer belt 20 to the recording sheet P.

The second transfer power supply 28 generally applies a voltage of about a few thousand volts to the roller 24A. Therefore, the image forming apparatus 10 according to the first exemplary embodiment connects a protection device 27 to a connection line that connects the second transfer power supply 28 and the roller 24A.

If the second transfer power supply 28 breaks down and outputs an abnormal voltage that is greater than or equal to a pre-set voltage exceeding a steady-state voltage output in a steady state, the protection device 27 prevents application of the abnormal voltage to a load, such as the roller 24A or the second transfer roller 38, connected to the second transfer power supply 28.

In response to application of abnormal voltage to the protection device 27, the protection device 27 outputs a control signal to a controller 86 (see FIG. 4) described later. In response to input of the control signal, output from the protection device 27, to the controller 86, the controller 86 stops the abnormal voltage output from the second transfer power supply 28.

A fixer 40 is arranged downstream from the second transfer roller 38, in a direction in which the recording sheets P are carried (in a direction indicated by arrow C in FIG. 2). The fixer 40 includes a heating roller 40A that heats a toner image on a recording sheet P, and a roller 40B pressed against the heating roller 40A. As the recording sheet P passes a nip part between the heating roller 40A and the roller 40B, the toner image is melted, solidified, and fixed to the recording sheet P. The recording sheet P is ejected outside the image forming apparatus 10 by a sheet ejection roller (not illustrated) arranged downstream from the fixer 40, in a direction in which the recording sheet P is carried.

So far, a process of forming an image on a recording sheet P has been described using the image forming unit 54 which uses a rotary developing system (four cycle system) by way of example.

However, the image forming unit 54 according to the first exemplary embodiment may be one that uses the so-called tandem system which arranges photoconductor drums of Y, M, C, and K in series on the intermediate transfer belt 20, and transfers a toner image on the photoconductor drum 12 to the image forming face of the intermediate transfer belt 20.

Figure 3:
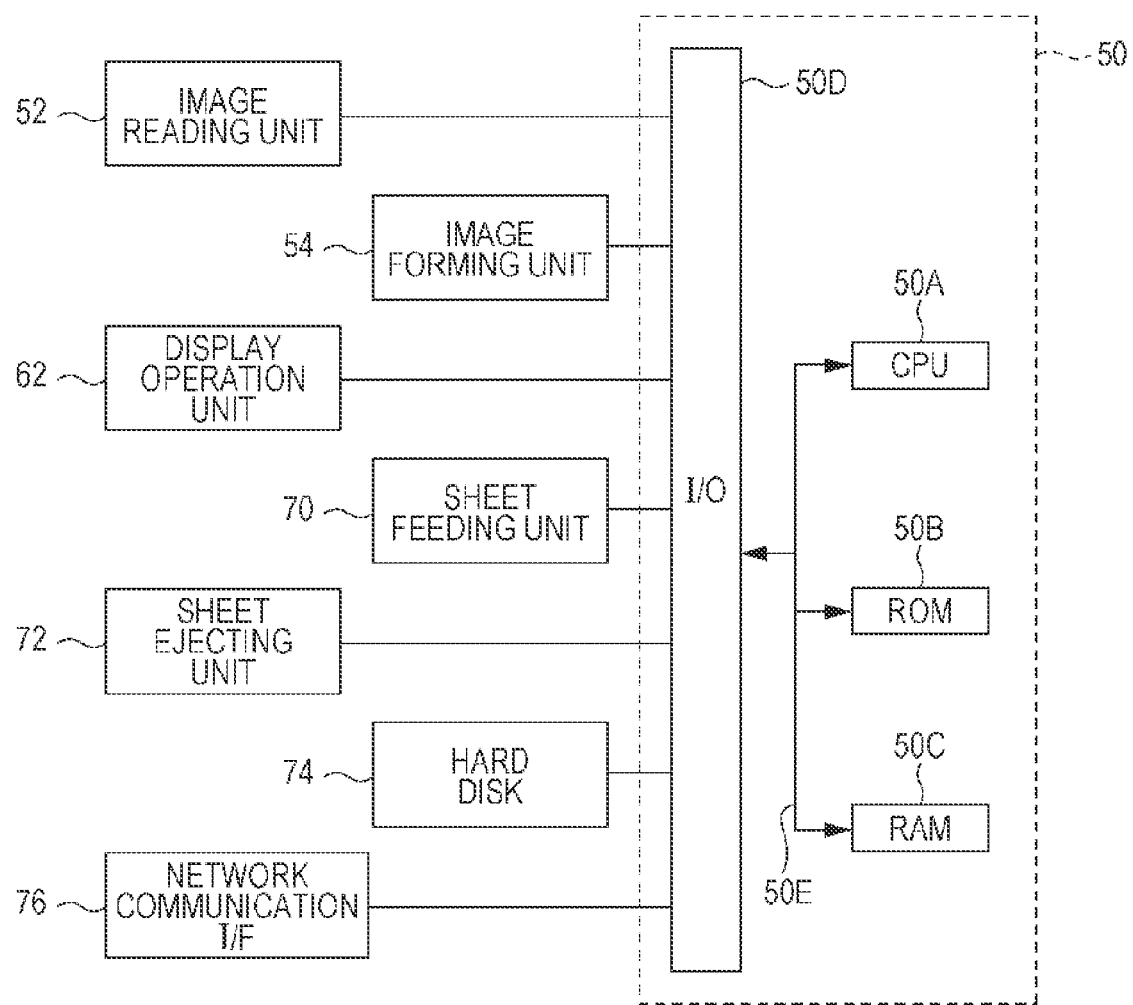
FIG. 3 is a block diagram illustrating the configuration of a major portion of the electrical system of the image forming apparatus according to the exemplary embodiments.

FIG. 3 is a block diagram illustrating the configuration of a major portion of the electrical system of the image forming apparatus 10 according to the first exemplary embodiment. As depicted in FIG. 3, the image forming apparatus 10 includes a computer 50.

The computer 50 includes a central processing unit (CPU) 50A, a read-only memory (ROM) 50B, a random-access memory 50C, and an input/output interface (I/F) 50D, which are interconnected via a bus 50E.

For example, the image reading unit 52, the image forming unit 54, the display operation unit 62, a sheet feeding unit 70, a sheet ejecting unit 72, a hard disk 74, and a network communication interface (I/F) 76 are connected to the I/O 50D.

The sheet feeding unit 70 includes, for example, the sheet container 30 which contains the recording sheets P serving as recording media, and a feeding mechanism that feeds the recording sheets P from the sheet container 30 to the image forming unit 54.

The sheet ejecting unit 72 includes, for example, an ejection part where the recording sheets P are ejected, and an ejecting mechanism for ejecting a recording sheet P on which an image is formed by the image forming unit 54 onto the ejection part.

The hard disk 74 stores, for example, log data such as the operating status of each unit of the image forming apparatus 10, log data of the result of processing such as copying or printing, various types of setting data, and a control program of the image forming apparatus 10.

The network communication I/F 76 is an interface for performing mutual data communication with a terminal device such as a personal computer (not illustrated).

A control program of a process described later is stored in advance in, for example, the hard disk 74, and is read and executed by the CPU 50A.

Alternatively, a configuration in which the control program is recorded on a storage medium such as a compact disc read-only memory (CD-ROM) or the like, and the control program is read and executed by a CD-ROM drive or the like, or a configuration in which the control program is received via a wired or wireless communication unit and executed may be used.

Figure 4:
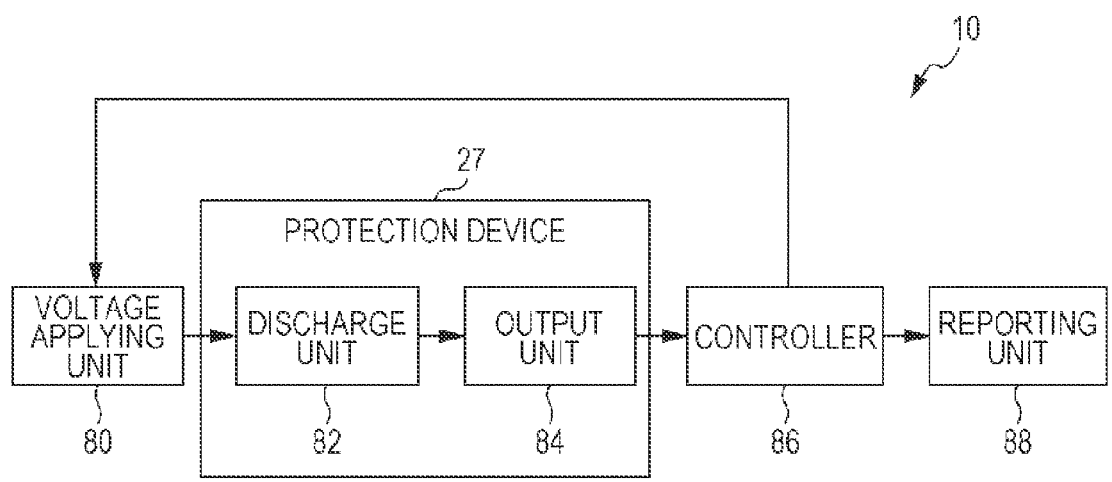
FIG. 4 is a functional block diagram illustrating the functional configuration of the image forming apparatus according to the exemplary embodiments.

FIG. 4 is a functional block diagram illustrating the functional configuration of the image forming apparatus 10 according to the first exemplary embodiment.

As depicted in FIG. 4, the image forming apparatus 10 according to the first exemplary embodiment includes a voltage applying unit 80, the protection device 27 including a discharge unit 82 and an output unit 84, the controller 86, and a reporting unit 88.

Upon receipt of, for example, a voltage application instruction or a voltage stopping instruction from the controller 86, the voltage applying unit 80 starts or stops applying voltage to the charging power supply 15, the first transfer power supply (not illustrated), the second transfer power supply 28, or the like.

When, for example, the second transfer power supply 28 applies voltage to the roller 24A, if abnormal voltage is applied due to breakdown of the second transfer power supply 28 or the like, the discharge unit 82 performs discharge and prevents application of the abnormal voltage to the roller 24A.

The output unit 84 generates a control signal from discharge current that flows during discharge performed by the discharge unit 82, and outputs the control signal outside the protection device 27.

The controller 86 controls, for example, the voltage applying unit 80 to perform power supply management of the image forming apparatus 10. At the same time, the controller 86 controls the reporting unit 88 to report abnormal voltage in case of detection of abnormal voltage.

Although the display 64 is used to display the occurrence of an abnormality in each unit of the image forming apparatus 10 in the first exemplary embodiment, the first exemplary embodiment is not limited to the this case. For example, the occurrence of an abnormality may be reported by sound, or the occurrence of an abnormality may be displayed on a terminal device such as a personal computer (not illustrated) via the network communication I/F 76.

When a control signal output from the output unit 84 is input to the controller 86, the controller 86 performs power supply stop control of the voltage applying unit 80.

There are two types of power supply stop control: overall power supply stop control and individual power supply stop control.

Overall power supply stop control reports a voltage stopping instruction to the voltage applying unit 80, thereby forcedly stopping the voltage output of all the power supplies included in the image forming apparatus 10 and invalidating the operation of the main power switch 68.

Individual power supply stop control is the same as overall power supply stop control in the point that all the power supplies included in the image forming apparatus 10 are forcedly stopped by reporting a voltage stopping instruction to the voltage applying unit 80. However, individual power supply stop control is different in the point that, when the main power switch 68 is turned on again to give an instruction to activate the image forming apparatus 10, the controller 86 does not activate a power supply that has output the abnormal voltage, but reports a voltage application instruction to the voltage applying unit 80 in order to activate a power supply (not illustrated) for activating at least the display operation unit 62.

Which type of control is to be used in power supply stop control is pre-set by the administrator of the image forming apparatus 10, and the setting details are stored in advance in, for example, the hard disk 74. When a control signal output from the output unit 84 is input to the controller 86, the controller 86 reads the setting details stored in advance in the hard disk 74 and controls the voltage applying unit 80 in accordance with the setting details.

Figure 5:
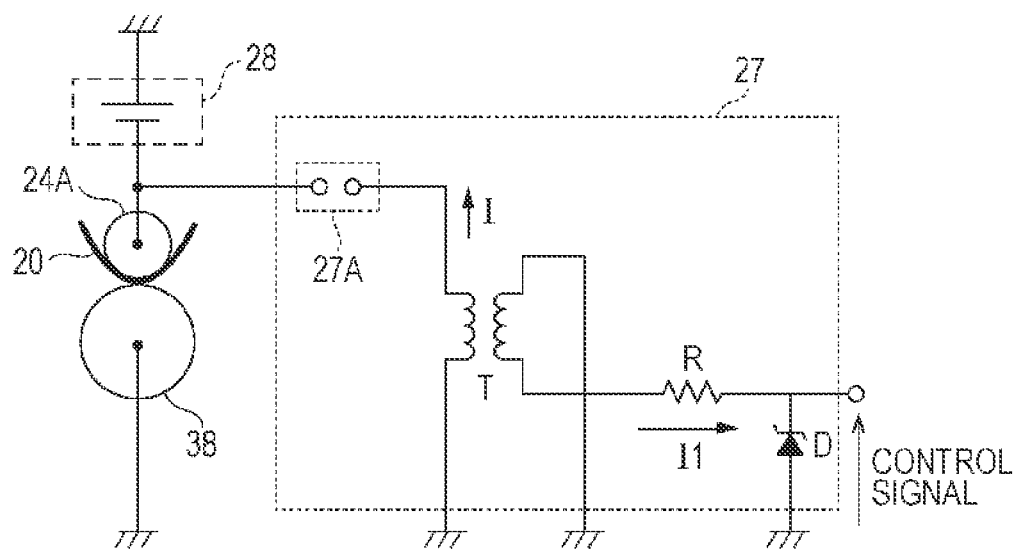
FIG. 5 is a schematic diagram illustrating the configuration of a major portion of a protection device according to the exemplary embodiments.

FIG. 5 is a schematic diagram illustrating the configuration of a major portion of the protection device 27 according to the first exemplary embodiment.

In the protection device 27 according to the first exemplary embodiment, one of a pair of electrodes 27A with a discharge gap is connected to a connection line that connects the roller 24A, arranged facing the second transfer roller 38, and the second transfer power supply 28. The other one of the pair of electrode 27A is connected to ground via a pulse transformer T. The output unit 84 which outputs a control signal is electrically insulated by the pulse transformer T from the second transfer power supply 28.

In response to application of abnormal voltage from the second transfer power supply 28 to the pair of electrodes 27A due to breakdown of the second transfer power supply 28 or the like, discharge occurs between the pair of electrodes 27A. Therefore, the abnormal voltage is not applied to the roller 24A, the intermediate transfer belt 20, and the second transfer roller 38, which receive voltage supplied from the second transfer power supply 28.

When discharge occurs between the pair of electrodes 27A, a closed circuit that connects the second transfer power supply 28, the pair of electrodes 27A, and the pulse transformer T is formed, and current I flows through the closed circuit.

Because one of the pair of electrodes 27A is connected to a load of the second transfer power supply 28, the current I flows from the pulse transformer T to the pair of electrodes 27A in the protection device 27 according to the first exemplary embodiment.

While the current value of the current I flowing through the primary side of the pulse transformer T is changing, induced electromotive force is generated on the secondary side of the pulse transformer T, and current I1 flows through the secondary side of the pulse transformer T. The current I1 is converted into voltage by a resistor R and is output as a control signal to the outside of the protection device 27.

Figure 6:
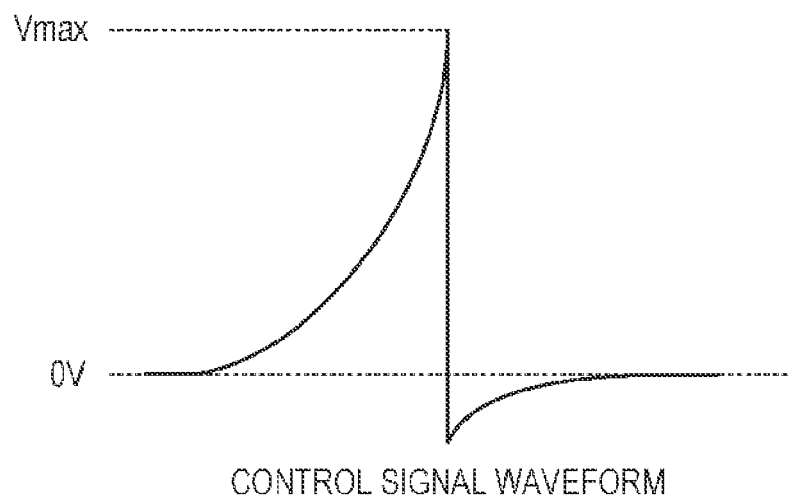
FIG. 6 is a waveform chart of a control signal of the protection device according to the exemplary embodiments.

FIG. 6 is a waveform chart of a control signal output from the protection device 27 according to the first exemplary embodiment. The voltage value Vmax of peak voltage of the control signal is adjusted by changing the resistance value of the resistor R included in the protection device 27.

The voltage value Vmax may be adjusted to be greater than or equal to a voltage value detectable by the controller 86.

A Zener diode D is connected to an output terminal of the control signal of the protection device 27 in order to electrically protect a circuit of the controller 86 of the image forming apparatus 10, which receives the control signal.

The pair of electrodes 27A according to the first exemplary embodiment perform discharge in response to application of a voltage greater than or equal to a pre-set voltage value exceeding a steady-state voltage output by the second transfer power supply 28 in a steady state. The pre-set voltage value at which discharge occurs is set by adjusting the distance between the electrodes of the pair of electrodes 27A.

FIGS. 7A to 7F illustrate examples of the shapes of the electrodes of the pair of electrodes 27A of the protection device 27 according to the first exemplary embodiment.

Figure 7A:
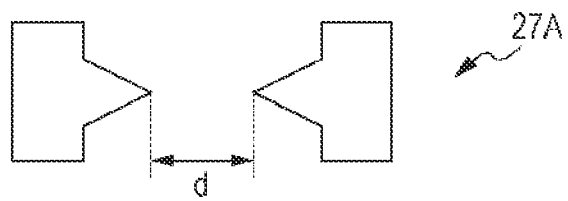
FIGS. 7A to 7F are schematic diagrams provided to describe the shapes of electrodes of the protection device according to the exemplary embodiments.

As depicted in FIG. 7A, for example, the shapes of the electrodes of the pair of electrodes 27A are bulging out in directions facing each other. For example, the tip of each bulging out shape is pointed.

The pre-set voltage value at which discharge occurs is set by adjusting the minimum distance between the electrodes of the pair of electrodes 27A, that is, a distance d from the tip of the bulging out shape of one electrode to the tip of the bulging out shape of the other electrode. The longer the distance d, the pre-set voltage value at which discharge occurs becomes greater. The shorter the distance d, the pre-set voltage value at which discharge occurs becomes smaller.

Although affected by environmental conditions such as temperature or humidity, the pre-set voltage value at which discharge occurs generally becomes about 3000 V to 4000 V when the distance d is adjusted to about 2 mm to 3 mm.

Figure 7B:
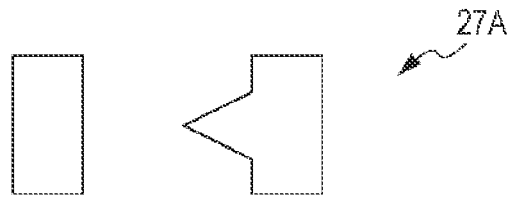
Figure 7C:
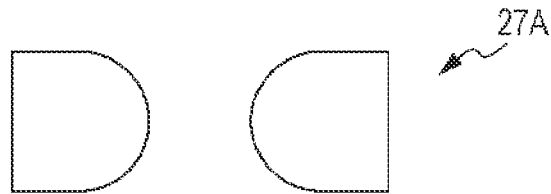

Although the shapes of the electrodes of the pair of electrodes 27A according to the first exemplary embodiment are bulging out in directions facing each other, the shapes of the electrodes are not limited to these shapes. For example, as depicted in FIG. 7B, the shape of one electrode may be bulging out, and the shape of the other electrode may be planar. Alternatively, as depicted in FIG. 7C, the tips of the bulging out shapes may have an obtuse angle and may be round.

Figure 7D:
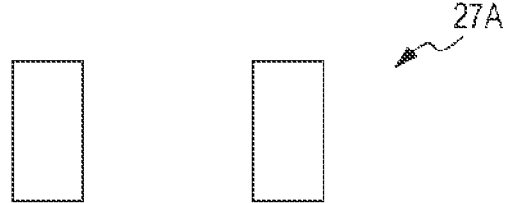
Figure 7E:
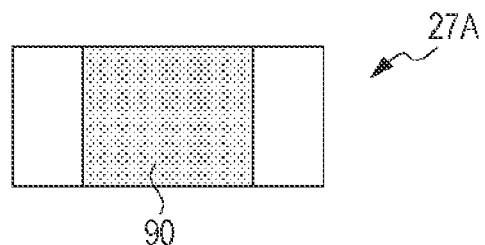
Figure 7F:
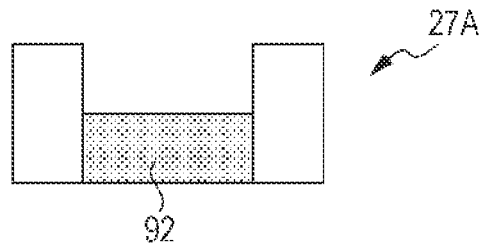

Furthermore, as depicted in FIG. 7D, the shapes of both the electrodes of the pair of electrodes 27A may be planar. Alternatively, as depicted in FIG. 7E, an insulator 90 with the same width as the width in the longitudinal direction of the electrodes may be held between the pair of electrodes 27A. Alternatively, as depicted in FIG. 7F, an insulator 92 with a width shorter than the width in the longitudinal direction of the electrodes may be held between the pair of electrodes 27A.

Figure 8:
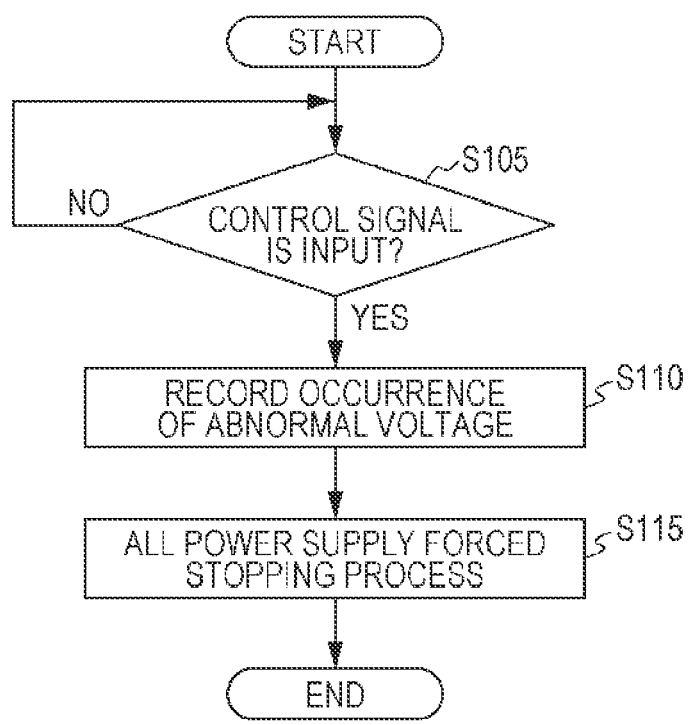
FIG. 8 is a flowchart of a process executed by a computer of the image forming apparatus according to a first exemplary embodiment.

Referring now to FIG. 8, the operation of the image forming apparatus 10 when executing power supply stop control according to the first exemplary embodiment will be described.

FIG. 8 is a flowchart illustrating the flow of a process of an image forming program executed by the CPU 50A of the computer 50 of the image forming apparatus 10. The program is stored in advance in a predetermined region of the hard disk 74.

The process of power supply stop control according to the first exemplary embodiment is set in advance by the administrator to perform overall power supply stop control. Power supply stop control is executed by the CPU 50A while the power of the image forming apparatus 10 is on.

In step S105, the process monitors a control signal output from the protection device 27, which indicates detection of abnormal voltage at the second transfer power supply 28, and determines whether a control signal is input. When the determination is negative, the process returns to step S105 and continues monitoring a control signal. When the determination is positive, the process proceeds to step S110.

In step S110, detection of abnormal voltage at the second transfer power supply 28 is recorded in a predetermined region of the hard disk 74. The recording destination of detection of abnormal voltage is not limited to this destination, and detection of abnormal voltage may be recorded in a recording device included in a terminal device such as a personal computer (not illustrated) via the network communication I/F 76.

In step S115, the process reads the control type of power supply stop control stored in advance in the hard disk 74.

In the first exemplary embodiment, the setting of overall power supply stop control is read as the control type of power supply stop control. Thus, the process invalidates the operation of the main power switch 68 from this step onward, and reports a voltage stopping instruction, which stops voltage of all the power supplies included in the image forming apparatus 10, to the voltage applying unit 80. Accordingly, the power supplied to the image forming apparatus 10 is forcedly turned off.

Thus, even when the main power switch 68 is turned on after step S115 is performed, because the main power switch 68 has been invalidated, no power is supplied to the image forming apparatus 10, and no abnormal voltage is output from the second transfer power supply 28.

Although the protection device 27 is used to detect abnormal voltage output by the second transfer power supply 28 in the first exemplary embodiment, the first exemplary embodiment is not limited to this case. The protection device 27 may be used to detect abnormal voltage output by another power supply, such as the charging power supply 15 or the first transfer power supply (not illustrated), included in the image forming apparatus 10.

According to the first exemplary embodiment, the protection device 27 is arranged independent of a power supply or a load that receives voltage supplied from the power supply. When abnormal voltage is applied from a power supply, the protection device 27 performs discharge using the pair of electrodes 27A, detects discharge current that flows during discharge, and outputs the discharge current as a control signal to the outside.

When a control signal output from the protection device 27 is input to the image forming apparatus 10, power supplies included in the image forming apparatus 10 are forcedly stopped, and, even when an instruction to activate the image forming apparatus 10 is given, no power is supplied to the image forming apparatus 10 again.

Second Exemplary Embodiment

Next, a second exemplary embodiment of the invention will be described. In the second exemplary embodiment, in addition to the process described in the first exemplary embodiment, detection of abnormal voltage in the image forming apparatus 10 is reported to the user.

Referring to FIG. 9, the operation of the image forming apparatus 10 when executing power supply stop control according to the second exemplary embodiment will be described.

FIG. 9 is a flowchart illustrating the flow of a process of an image forming program executed by the CPU 50A of the computer 50 of the image forming apparatus 10. The program is stored in advance in a predetermined region of the hard disk 74.

The process of power supply stop control according to the second exemplary embodiment is set in advance by the administrator to perform individual power supply stop control. Power supply stop control is executed by the CPU 50A while the power of the image forming apparatus 10 is on.

The process illustrated in FIG. 9 is different from the process illustrated in FIG. 8 in the point that the processing in steps S100, S102, and steps S120 to S140 is added. The processing in the other steps is the same as that in FIG. 8, and descriptions thereof are appropriately omitted.

In step S100, the process monitors the selection status of the main power switch 68 to determine whether the main power switch 68 is turned off. When the determination is negative, the process proceeds to step S105. When the determination is affirmative, the process proceeds to step S102.

In step S102, the process executes a predetermined process upon stopping of the power supply, which is executed when the main power switch 68 is turned off, such as recording various types of data on the RAM 50C in a predetermined region of the hard disk 74.

In steps S105 and S110, the process executes the same processing as that in the first exemplary embodiment.

When the determination in step S105 is negative, the process returns to step S100.

In step S120, the process reads the control type of power supply stop control, which is stored in advance in the hard disk 74.

In the second exemplary embodiment, the setting of individual power supply stop control is read as the control type of power supply stop control. Thus, the process reports, to the voltage applying unit 80, a voltage stopping instruction that stops voltage of all the power supplies included in the image forming apparatus 10. Accordingly, the power supplied to the image forming apparatus 10 is forcedly turned off.

In step S125, the process determines whether the main power switch 68 is turned on. When the determination is negative, the process enters standby until the main power switch 68 is turned on. When the determination is affirmative, the process proceeds to step S130.

In step S130, the process reads the data in the predetermined region of the hard disk 74, which has been written in step S110, and determines whether detection of abnormal voltage at the second transfer power supply 28 is recorded. When the determination is negative, the process proceeds to step S132. When the determination is affirmative, the process proceeds to step S135.

In step S132, since there is no abnormality in the second transfer power supply 28, the process enters standby until a print instruction is given from the user.

In step S135, the process reports a voltage application instruction to the voltage applying unit 80 in order to activate power supplies other than the second transfer power supply 28 included in the image forming apparatus 10, such as a driving power supply (not illustrated) of the display 64 of the display operation unit 62. Therefore, the second transfer power supply 28, which is not included in the voltage application instruction, will not be activated.

In step S140, the process controls the reporting unit 88 to display, on the display 64, the occurrence of an abnormality in the second transfer power supply 28, thereby prompting the user to call for a serviceman to do maintenance of the image forming apparatus 10.

Note that the method of reporting a power supply abnormality is not limited to the above method. For example, a power supply abnormality may be reported by sound, or the fact that the power supply broke down may be displayed on a terminal device such as a personal computer (not illustrated) via the network communication I/F 76.

According to the second exemplary embodiment, in response to turning on of the main power switch 68, power supplies other than a power supply that has output abnormal voltage are activated. In this way, the operating status of the image forming apparatus 10 is reported to the user.

Although the exemplary embodiments of the invention have been described as above, the technical scope of the exemplary embodiments is not limited to that described in the foregoing exemplary embodiments. Various changes or improvements can be added to the foregoing exemplary embodiments without departing from the gist thereof. The exemplary embodiments with these changes or improvements are also included in the technical scope of the exemplary embodiments.

Although the case in which the power supply stop control of the image forming apparatus 10 is realized by a software configuration has been described in the foregoing exemplary embodiments, the exemplary embodiments are not limited to this case. For example, the power supply stop control may be realized by a hardware configuration.

An exemplary embodiment in this case generates and uses, for example, a functional device that executes the same processing as that executed by the controller 86. In this case, the speed of processing is expected to be faster, compared with the above-described exemplary embodiments.

Although the protection device 27 according to the exemplary embodiments is arranged in the body of the image forming apparatus 10, the protection device 27 may be arranged outside the body of the image forming apparatus 10.

In this case, compared with the above-described exemplary embodiments, the voltage value Vmax is expected to be easily adjusted by changing the resistance value of the resistor R of the protection device 27.

Although the protection device 27 is applied to the image forming apparatus 10 in the foregoing exemplary embodiments, the scope of application of the protection device 27 is not limited to that described above. For example, the protection device 27 may be used in an electronic device, such as a television, which may output abnormal voltage when its power supply breaks down.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A protection device comprising:
a pair of electrodes in which one electrode, connected to a connection line that connects a load and a power supply that supplies voltage to the load, is configured to perform discharge toward the other electrode in response to application, to one electrode, of an abnormal voltage greater than or equal to a pre-set voltage exceeding a steady-state voltage output by the power supply in a steady state; and
an output unit configured to detect discharge current that flows in the other electrode and output the detected discharge current as a control signal,
wherein the distance between the pair of electrodes is adjusted in accordance with the voltage value of the pre-set voltage.

2. The protection device according to claim 1, wherein the shape of at least one electrode of the pair of electrodes is bulging out toward the other electrode facing the at least one electrode.

3. The protection device according to claim 1, wherein an insulator is held between the pair of electrodes.

4. The protection device according to claim 2, wherein an insulator is held between the pair of electrodes.

5. An image forming apparatus comprising:
a protection device according to claim 1; and
a controller configured to control, in response to input of the control signal, the power supply not to supply voltage to the load even when an instruction is given to activate the power supply.

6. The image forming apparatus according to claim 5, further comprising a reporting unit configured to report information relating to an operating status,
wherein the controller is configured to control, in response to input of the control signal, the reporting unit to report the occurrence of an abnormality in the power supply.

7. A non-transitory computer readable medium storing a program causing a computer to execute an image forming process, the process comprising:
detecting discharge current that flows in, of a pair of electrodes in which one electrode, connected to a connection line that connects a load and a power supply that supplies voltage to the load, performs discharge toward the other electrode in response to application, to one electrode, of an abnormal voltage greater than or equal to a pre-set voltage exceeding a steady-state voltage output by the power supply in a steady state, the other electrode and outputting the detected discharge current as a control signal; and
controlling, in response to input of the control signal, the power supply not to supply voltage to the load even when an instruction is given to activate the power supply.

8. An image forming method comprising:
detecting discharge current that flows in, of a pair of electrodes in which one electrode, connected to a connection line that connects a load and a power supply that supplies voltage to the load, performs discharge toward the other electrode in response to application, to one electrode, of an abnormal voltage greater than or equal to a pre-set voltage exceeding a steady-state voltage output by the power supply in a steady state, the other electrode and outputting the detected discharge current as a control signal; and
controlling, in response to input of the control signal, the power supply not to supply voltage to the load even when an instruction is given to activate the power supply.

9. A protection device comprising:
a pair of electrodes in which one electrode, connected to a connection line that connects a load and a power supply that supplies voltage to the load, is configured to perform discharge toward the other electrode in response to application, to one electrode, of an abnormal voltage greater than or equal to a pre-set voltage exceeding a steady-state voltage output by the power supply in a steady state; and
an output unit configured to detect discharge current that flows in the other electrode and output the detected discharge current as a control signal,
wherein the shape of at least one electrode of the pair of electrodes is bulging out toward the other electrode facing the at least one electrode.

10. An image forming apparatus comprising:
a protection device comprising:
a pair of electrodes in which one electrode, connected to a connection line that connects a load and a power supply that supplies voltage to the load, is configured to perform discharge toward the other electrode in response to application, to one electrode, of an abnormal voltage greater than or equal to a pre-set voltage exceeding a steady-state voltage output by the power supply in a steady state; and an output unit configured to detect discharge current that flows in the other electrode and output the detected discharge current as a control signal; and a controller configured to control, in response to input of the control signal, the power supply not to supply voltage to the load even when an instruction is given to activate the power supply.

* * * * *